Feb. 17, 1942. E. LIPSON 2,273,363
METHOD FOR ELECTRICAL INVESTIGATION OF CASED DRILL HOLES
Filed Nov. 28, 1939 2 Sheets-Sheet 1

EDWARD LIPSON
INVENTOR.
BY Jesse R. Stone
Lester B. Clark
ATTORNEYS

Feb. 17, 1942.  E. LIPSON  2,273,363

METHOD FOR ELECTRICAL INVESTIGATION OF CASED DRILL HOLES

Filed Nov. 28, 1939  2 Sheets-Sheet 2

EDWARD LIPSON
INVENTOR.
BY Jesse R. Stone
  Lester B Clark
ATTORNEYS

Patented Feb. 17, 1942

2,273,363

UNITED STATES PATENT OFFICE 2,273,363

METHOD FOR ELECTRICAL INVESTIGATION
OF CASED DRILL HOLES

Edward Lipson, Houston, Tex.

Application November 28, 1939, Serial No. 307,473

2 Claims. (Cl. 175—182)

This invention relates to new and useful methods for determining the nature of subsurface strata penetrated by a well bore. More particularly the invention comprehends methods for the logging of cased bore holes by the utilization of an electric current which is passed between a movable electrode within the well bore and a ground electrode embedded in the earth at a point in spaced relation with the bore hole.

It is known that, when an electric potential is applied between an electrode within a casing in a bore hole and an electrode embedded in the ground at a point spaced therefrom, an electric current will flow thru the superposed strata between such electrodes. It is also known that a potential of relatively low value applied between an electrode within a well casing and a second electrode grounded exteriorly thereof will cause a current to flow therebetween and that such current will vary proportionally with the variations in the applied potential. It has been found, however, that as the potential is increased, a point will be reached at which a considerable increase in current will take place from a small change in potential between the electrodes and that further increases in the potential between the electrodes will then again cause substantially proportional increases in the earth current.

It is of course known that the casing oxidizes whereby an oxide coating exists thereon and it is believed that, at the point at which the disproportionate increase in the earth current takes place, such oxide coating breaks down and that a current flowing from the casing supplements or is superposed upon the current conducted thru the casing and thence to the grounded electrode. The present invention takes advantage of the total current flowing thru the earth between the electrodes.

A primary object of the invention is to electrically log a cased well bore to reveal the nature, location and extent of geologic strata penetrated thereby.

Another object is to obtain desired information of penetrated earth formations even though casing has been set within the bore hole penetrating such formations.

Still another object is to correlate, over an area penetrated by the bore holes, the subsurface strata having the same or similar electric characteristics.

Another object is to pass an electric current between points within a cased bore hole and a point in the earth spaced exteriorly therefrom in a manner that reliable information of the penetrated formations is revealed.

Still another object is to pass a current thru the earth from within the casing in a cased bore hole, such current including a cathodic component which assists in revealing the nature of strata penetrated by the bore hole.

Other objects together with the foregoing will be apparent from the following description taken in connection with the drawings in which.

Figure 1:
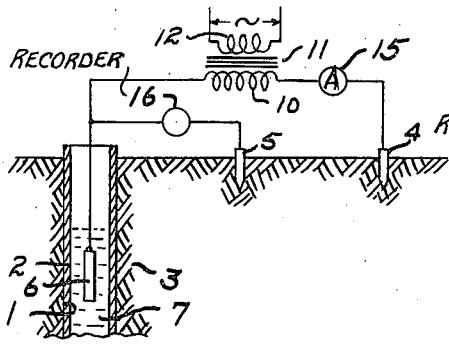
Fig. 1 is a diagrammatic illustration of an embodiment of the invention in which alternating current is used.

In the drawings the reference character 1 indicates a bore hole in which a string of casing 2 has been set, such casing and bore hole traversing subsurface formations 3 of which information is desired. Current and potential electrodes 4 and 5 are embedded in the earth in spaced relation to each other and to the bore hole 1 in which is placed a movable electrode 6 immersed in the fluid 7 which serves as an electrolytic conductor between the electrode 6 and the casing 2. As will more fully appear, it is to be noted that the electrode 6 in certain of the embodiments of the invention serves as both a current and a potential electrode.

It is preferable though not essential to the invention that each of the electrodes used as an element of the apparatus be of the non-polarizing type, in order to avoid obscuring effects of polarization which might otherwise result.

In Fig. 1 a source of alternating current is shown as the secondary 10 of transformer 11 having primary winding 12 connected to a suitable primary source of alternate current (not shown). The terminals of the secondary 10 are connected respectively to electrodes 4 and 6. An ammeter 15 is provided in the circuit to observe variations in the current flowing therein.

It is obvious that by means of the electric circuit above described a current will flow upon the application of potential to the primary terminals of the transformer 11. As previously explained, however, the flow of current thru this circuit, including the earth current flowing thru the strata intermediate the electrodes 4 and 6, does not conform with Ohm's Law throughout a wide range of potential fluctuations, inasmuch as a disproportionate current flows if a certain limit of current is caused to flow between the electrodes 4 and 6.

By way of illustration it may be stated that the limiting critical values of current have been found to be in the neighborhood of 0.2 ampere to 1.0 ampere. The potential necessary to produce a current within these limits will, of course, depend upon the resistance between the current conducting electrodes, which resistance depends upon the area under investigation and conditions in the area at the time of the investigation. Then by measuring the fluctuations of the earth current as the electrode 6 is made to traverse the casing 2 within the bore hole 1, information is obtained as to the nature, location and extent of the traversed earth strata.

In order to observe the fluctuations in the earth current a conductive connection is provided between the electrodes 5 and 6 and thru an indicating instrument 16, such as a sensitive voltmeter, potentiometer, or suitable amplifying means together with an indicating or recording instrument.

The electrode 5 is shown as substantially midway between the well bore 1 and the electrode 4. This relationship is not essential since other ratios of spacing may be used. Attention is also directed to the fact that it has been found that results are enhanced when the spacing between the electrodes 4 and 5 and the well bore 1 is increased as the electrode 6 is lowered into the well bore. The change in location of the electrodes 4 and 5 under such circumstances should maintain a constant ratio of distances of these electrodes from the well bore for a given series of observations.

Satisfactory results have been obtained by locating the electrodes 4 and 5 a distance of 300 feet and 150 feet respectively from the bore hole for wells up to approximately 4000 feet in depth. For wells greater in depth results are improved if a greater spacing is utilized. It is to be understood however that the indicated spacings are illustrative and are not limiting.

Figure 2:
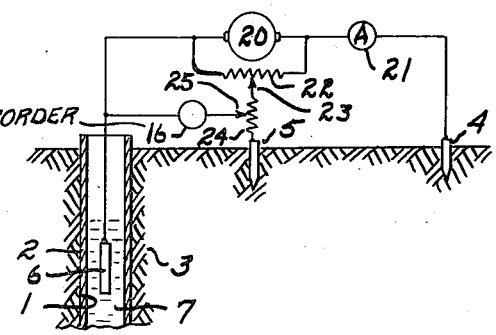
Fig. 2 is a diagrammatic illustration similar to that shown in Fig. 1 but illustrates the practice of the invention by use of direct current.

Fig. 2 illustrates the use of a direct electrical potential in accordance with the invention, a direct current generator 20 being connected thru ammeter 21 to electrodes 4 and 6. A tapped resistor 22 is shunted about the generator 20 and the tap 23 is in turn connected thru a second tapped resistor 24 to the potential electrode 5. The tap terminal 25 of the resistor 24 is connected thru the instrument 16 to the connector leading to the electrode 6. In this embodiment whereby the advantages of the invention may be realized, the tap terminal 25 may be moved so as to provide a desired range of readings on the instrument 16 and thereafter the variations in readings of the instrument provide the desired information. On the other hand the instrument 16 may be maintained constant either manually or automatically by the adjustment of the tap terminal 25 on the resistor 24. In this case the variation in the position of the tap terminal 25 is utilized to reveal the desired information. Since direct current is used in this embodiment of the invention it is of importance that the electrodes 4, 5 and 6 be of the non-polarizing type to avoid difficulties that might be experienced in the use of direct current.

Figure 3:
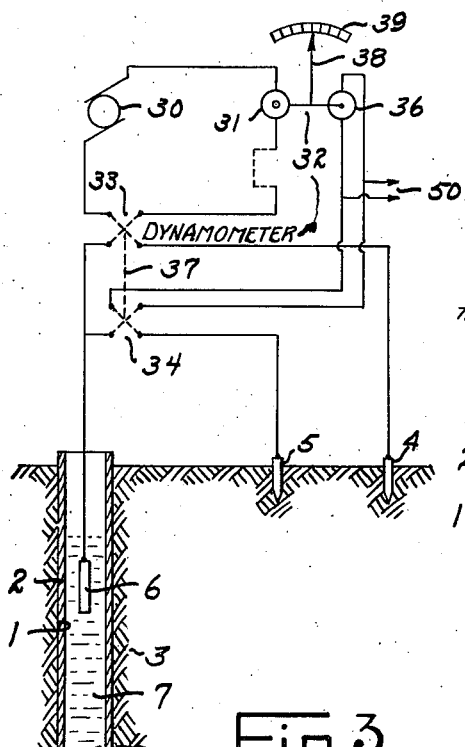
Fig. 3 illustrates the use of a source of direct current together with means for converting such current into alternating current for introduction into the earth.

In Fig. 3 the direct current generator 30 is connected thru coil 31 of the dynamometer 32 and commutator 33 to the electrodes 4 and 6. In this manner an alternating potential is applied between the grounded electrode 4 and the electrode 6 movable within the casing 2, while a direct current flows from the generator 30 thru the current coil 31 of the dynamometer 32.

A connection is provided between the potential electrode 5 and the electrode 6, such connection including a reversing switch 34, and current coil 36 of the dynamometer 32. The reversing switch 34 is directly connected with the commutator 33 as by means of a common shaft 37 and in this manner the switch 34 serves as a rectifying element whereby a rectified current is caused to flow thru the coil 36 of the dynamometer. The coils 31 and 36 of the dynamometer 32 are connected in torque opposition and hence the needle 38 attached thereto will assume a position over the scale 39 resulting from the relative values of these torques. The scale 39 may be calibrated to include relative resistivity or other electrical characteristics of the formations traversed by the electrode 6.

Figure 4:
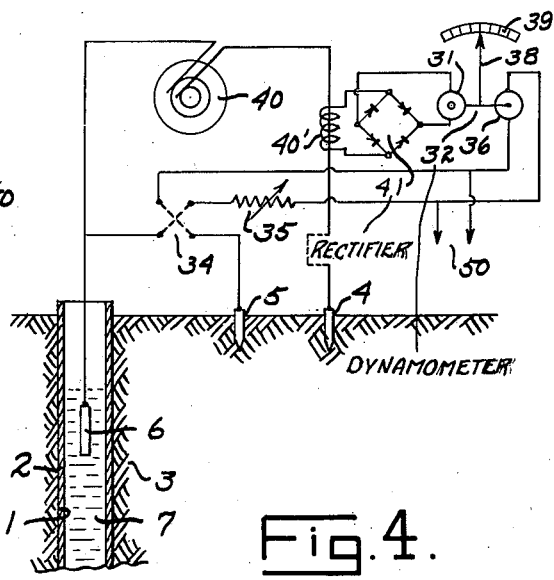
Fig. 4 illustrates the use of an alternator for passing current thru the earth, rectifying means being provided for indicating the variations in potential created by the earth current.

The construction shown in Fig. 4 is similar to that of Fig. 3 and like parts are shown by identical reference characters. In this construction an alternating potential is applied by means of the generator 40 to the electrodes 4 and 6. The potential electrode 5 is connected thru a reversing switch 34 to the electrode 6. This reversing switch operates in synchronism with potential fluctuations causing the earth current to flow and hence serves as a rectifier to supply a direct current thru a variable resistance 35 to the coil 36 of the dynamometer 32.

Opposing the torque produced by the coil 36 of the dynamometer 32 is a torque produced by current flowing in the coil 31 which current is obtained from a current transformer 40' in the current circuit, the secondary of such transformer supply current to a rectifier 41 from which the direct current output is supplied to the coil 31.

It is to be understood that the tap terminals 50 in each of Figs. 3 and 4 may be used to supply energy to any suitable indicating device whereby the fluctuation in potential from the electrodes 5 and 6 may be indicated or recorded.

Since the electrode 6 used in a manner already described serves as both a current and a potential electrode, the arrangement for carrying out the invention is in effect a four-electrode or four-terminal combination. It is believed obvious therefore that the invention may be carried out thru arrangements differing from those already specifically described.

Figs. 5 to 9 inclusive show in a diagrammatic way alternate arrangements that may be used in the practice of the invention. In these figures a panel 51 is shown as provided with four terminals in which the conductors of the system terminate for connection to the electrodes. Terminals 52 and 53 represent the current terminals for connection to the electrodes for supplying the earth current. Terminals 54 and 55 are potential terminals to supply a potential from the area of current conduction to the indicating and recording equipment.

Figure 5:
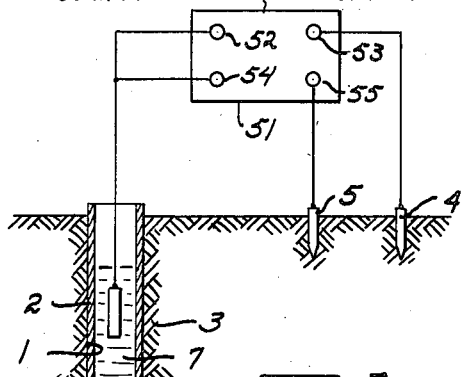
Figs. 5 to 9 illustrate electrode arrangements which may be used when practicing the invention.

Fig. 5 illustrates a connection of the current and potential terminals to the electrodes used in a manner above described. In accordance with Fig. 6 the casing 2 may be made to serve as one of the potential electrodes, the electrode 6 in this arrangement serving only as a current electrode.

Figure 7:
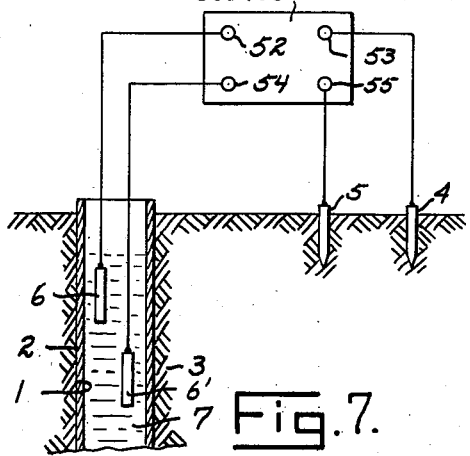

In Fig. 7 a separate movable electrode 6' is lowered within the casing 2 and is maintained in spaced relation with the current electrode 6. This arrangement is advantageous in that correlatable series of observations may be made by using different spacing of the electrodes 6 and 6' for the different series.

Figure 6:
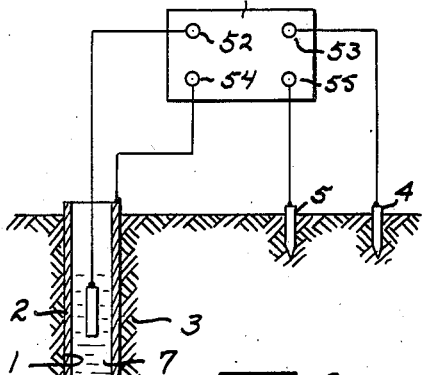
Figure 8:
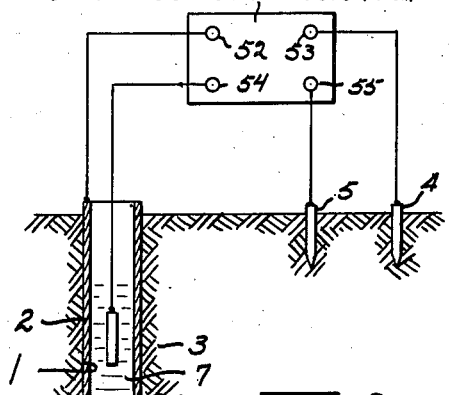

In Fig. 8 the connections to the terminals 52 and 54 are reversed as compared with the connections shown in Fig. 6 so that the earth current is applied thru the casing 2 passes to the earth formations and thence to the electrode 4 while the electrode 6' is lowered in the casing 1. The fluctuating potential thus indicates the varying potential gradient as the penetrated formations are traversed by the electrode 6', such variations being directly correlatable with the formations.

Figure 9:
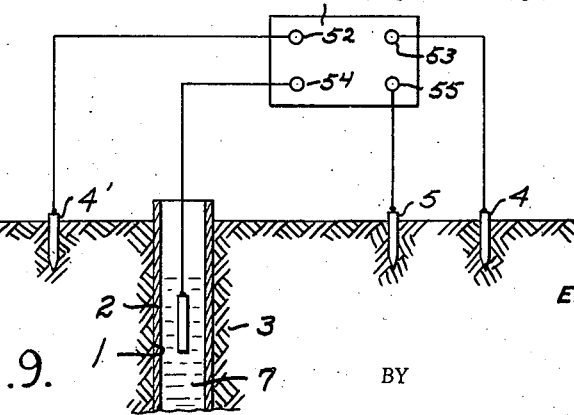

The arrangement illustrated in Fig. 9 is similar to that shown in Fig. 8 with the exception that an additional ground electrode 4' is utilized as one of the current electrodes instead of the casing 1.

In the operation of the invention as above illustrated and described the electrode 6 is lowered to a desired level in the well and electrical conditions are established whereby the described anomalous current conditions arise. The applied potential is then maintained constant while the electrode 6 is made to traverse the casing 2, measurements of current fluctuations being made to determine the varying nature of the formation exteriorly of the casing.

Broadly the invention comprehends means and method for logging a cased well bore by the use of an electric current of sufficient intensity that a cathodic component thereof contributes in making available the maximum of information as to the nature, location and extent of the earth formations traversed by the bore hole.

What is claimed is:

1. A method of determining the location, nature and extent of formations penetrated by a cased bore hole comprising the steps of, successively passing from points within the casing to a point in the earth exteriorly of the casing and in spaced relation with the bore hole an electric current between substantially the limits of 0.2 ampere and 1.0 ampere, and measuring the fluctuations of the potential between the said points within the casing and a point exteriorly thereof but in spaced relation with the well bore and the exterior point of current application.

2. The method of determining the character of earth formations penetrated by a cased bore hole containing a conductive liquid comprising the steps of, lowering an electrode within the liquid, continuously applying an electrical potential between said electrode and a second electrode in contact with the earth at a point in spaced relation with the well bore, such potential being of a value that the resulting current is disproportionate to the applied potential, and simultaneously and continuously measuring the fluctuations in the potential between the first mentioned electrode and a point in the earth in spaced relation with each the bore hole and said second electrode as an indication of the nature and extent of the respective formations penetrated by the well bore.

EDWARD LIPSON.